May 5, 1942.  L. H. DONNELL  2,282,173
LIGHTWEIGHT GIRDER
Filed Oct. 9, 1940
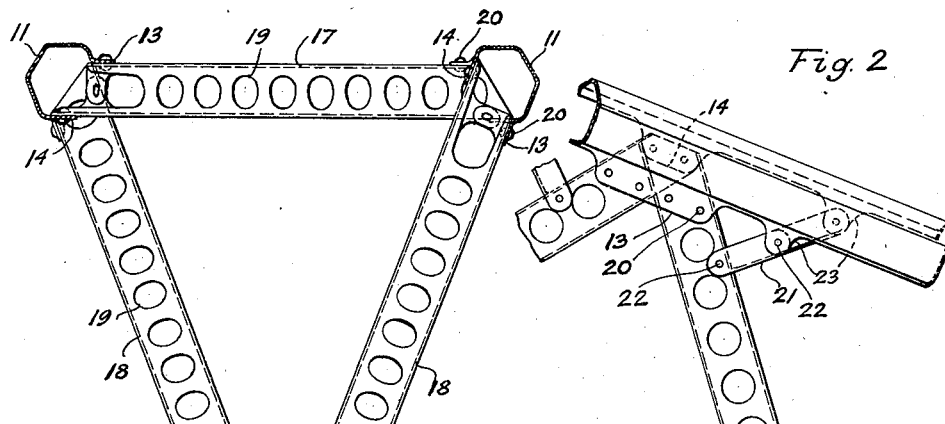
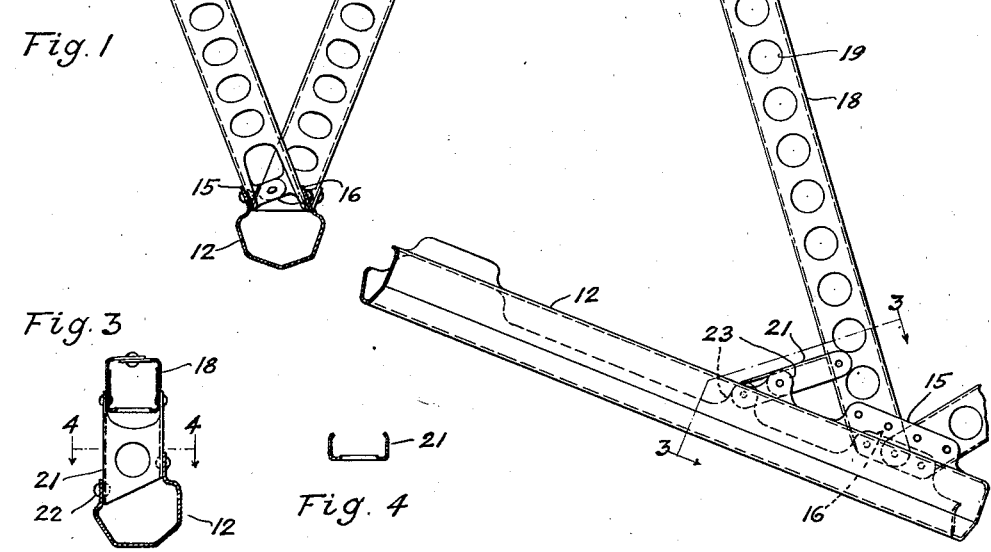
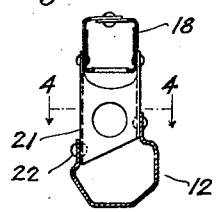
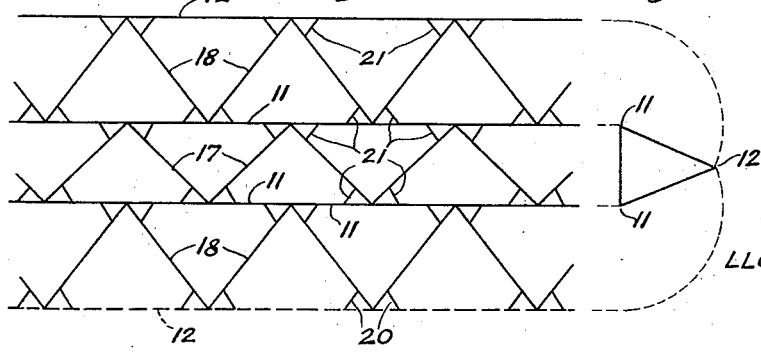
Inventor
LLOYD H. DONNELL
By
Attorney Patented May 5, 1942

2,282,173

UNITED STATES PATENT OFFICE 2,282,173

LIGHTWEIGHT GIRDER

Lloyd H. Donnell, Chicago, Ill., assignor, by mesne assignments, to Wingfoot Corporation, Akron, Ohio, a corporation of Delaware Application October 9, 1940, Serial No. 360,368

5 Claims. (Cl. 189—37)

This invention relates to the improvement of composite light-weight girders for aircraft use and in particular to girders which have chord members of open-channel cross-section.

Chord members of this type, especially when made of thin gauge sheet material, have a relatively low resistance in torsion and, therefore, girders in which such members are used also have a certain weakness in this respect, as well as a low compressive strength. It is the object of this invention to improve these conditions.

Aircraft girders composed of open-channel chord members which are connected by lattices or struts having branched ends, or by lattices having separate braces connecting the lattices with the chord members are known. These special-type lattices and the additional braces have the purpose of reducing the free length of the chord members between the spacing of ordinary lattices used previously and to increase the buckling strength of the chord members. These lattices were fastened, however, to only one flange of each chord member and, therefore, did not contribute much to their torsion resistance, and only increased to some extent their buckling strength. Other girder constructions are known in which the lattices or struts made of channels are fitted between flanges of open channel chord members and are riveted, or fastened otherwise, to both of their flanges or extensions thereof, thereby giving the chord members, as well as the girder, considerable rigidity against torsional forces. But even the torsional resistance of such girders can be improved perceptibly, especially if they are of large height and have standard lattice spacing which leaves rather large unsupported portions of the chord members.

According to this invention the free length of the chord channels can be considerably reduced, without employing a steeper lattice arrangement, by adding short, light channel braces connecting two opposite flanges of a lattice with two opposite flanges of the open chord channel in the angular corner space near the joint of a lattice and a chord member. Since in a composite girder having more than two chord members the apex of a pair of lattices connects to the chord member between the base of a pair of lattices of an adjacent side of the girder, the length of the free portion of a chord member is divided in half. By adding the channel braces between the lattices and the chord members of the girder, the free length of the chord members again is divided in three spaces of approximately equal, but rather short, length, thereby increasing the torsion resistance of the open chord channels considerably. Torsion and compression tests carried out with such girders have proved that their strength-weight ratio is much more favorable than that of girders without the additional bracing.

For a better understanding of this invention reference is now made to the accompanying drawing, of which:

Fig. 1 shows a cross-section of a triangular girder made according to the invention;

Fig. 2 is a fragmentary side view of Fig. 1;

Fig. 3 is a cross-section along the line 3—3 of Fig. 2;

Fig. 4 is a cross-section along the line 4—4 of Fig. 3;

Fig. 5 shows diagrammatically a view of the girder in development, and

Fig. 6, by the same method, a cross-section of the girder.

In the drawing, the items 11 and 12 designate the open channel chord members of the girder which are provided at their free longitudinal edges at equal distances with pairs of parallelly spaced ears or extensions 13, 14 and 15, 16, respectively, which are integral therewith. These extensions on the chord members are positioned alternately in the direction of the plane of one side of the girder and in the plane of a side adjacent thereto.

The lattices or struts 17 and 18 which are also of channel cross-section are provided with weight-reducing holes 19, and are fitted between and fastened with their opposite flanges by rivets 20, or otherwise, to corresponding extensions of the chord members. The struts in each side of the girder are arranged in zig-zag fashion in such a way that the apex of one pair of struts at one side of the girder halves the span of the chord member between the base of another pair of struts at an adjacent side of the girder. Braces 21, of channel cross-section, fastened by rivets 22, or otherwise, with their flanges at one end to the struts and at their other end to parallelly spaced extensions 23, integral with the free edges of the chord members, divide the free span of the chord members still more to about one-third of their length into substantially equal portions.

The diagrammatic view, Fig. 5, of the girder in development shows the arrangement of the lattices in relation to each other and also the subdivision of the free length of the chord members between the lattice joints by the braces.

With this construction, the torsional resistance of the open channel chord members is very much increased and hence the torsional, as well as the compressional, resistance of the girder.

Obviously, those skilled in the art to which this invention pertains may make various changes in the particular construction and arrangement of parts illustrated without departing from the spirit of this invention and therefore I do not wish to be limited in this invention except as may be hereinafter set forth in the claims hereunto appended.

Having thus fully described my invention, what I claim and desire to secure by Letters Patent of the United States is:

1. A girder made of sheet material for aircraft use, comprising a plurality of spaced open-channel chord members having free longitudinal edges at their open sides and parallelly spaced pairs of large and small extensions respectively integral with the free longitudinal edges of said chord members, struts of channel-shaped cross-section fitting between and being fastened to said large pairs of extensions to connect said chord members in zig-zag fashion, and braces of channel-shaped cross-sections connecting two opposite sides of a strut with a corresponding pair of said small extensions, thereby shortening the free length of a chord member between the joints of the struts and said chord members to increase the torsional resistance of said chord members as well as the torsional and compressional resistance of the girder.

2. A girder made of sheet material for aircraft use, comprising a plurality of spaced chord members of polygonal cross-section open towards the inside of the girder having free longitudinal edges at their open sides, parallelly spaced pairs of large and small extensions respectively integral with the free longitudinal edges of said chord members, struts of channel-shaped cross-section fitting between and being fastened to said large pairs of extensions to connect said chord members in zig-zag fashion, and braces of channel-shaped cross-sections connecting two opposite sides of a strut with a corresponding pair of said small extensions, thereby shortening the free length of a chord member between the joints of the struts and said chord members to increase the torsional resistance of said chord members, as well as the torsional and compressional resistance of the girder.

3. A girder made of sheet material for aircraft use, comprising a plurality of spaced open-channel chord members having free longitudinal edges at their open sides and parallelly spaced pairs of large and small extensions respectively integral with the free longitudinal edges of said chord members, struts of channel-shaped cross-section overlapping and being fastened to said large pairs of extensions to connect said chord members in zig-zag fashion, and braces of channel-shaped cross-sections connecting two opposite sides of a strut with a corresponding pair of said small extensions, thereby shortening the free length of a chord member between the joints of the struts and said chord members to increase the torsional resistance of said chord members as well as the torsional and compressional resistance of the girder.

4. A girder made of sheet material for aircraft use, comprising a plurality of spaced chord members of polygonal cross-section open towards the inside of the girder having free longitudinal edges at their open sides, parallelly spaced pairs of large and small extensions respectively integral with the free longitudinal edges of said chord members, struts of channel-shaped cross-section overlapping and being fastened to said large pairs of extensions to connect said chord members in zig-zag fashion, and braces of channel-shaped cross-sections connecting two opposite sides of a strut with a corresponding pair of said small extensions, thereby shortening the free length of a chord member between the joints of the struts and said chord members to increase the torsional resistance of said chord members, as well as the torsional and compressional resistance of the girder.

5. A device as set forth in claim 3 in which there are three substantially parallel chord members and in which the struts from any two of the chord members to the third chord member are connected to the latter member at spaced points longitudinally thereof, the struts from each of the first two mentioned chord members having their points of connection with the third chord member interspersed with the similar connections of the struts from the other of the first two mentioned chord members.

LLOYD H. DONNELL.